S. D. McLEAN.
Improvement in Bee-Hives.
No. 127,498.	Patented June 4, 1872.
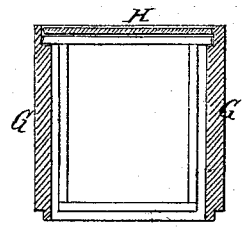
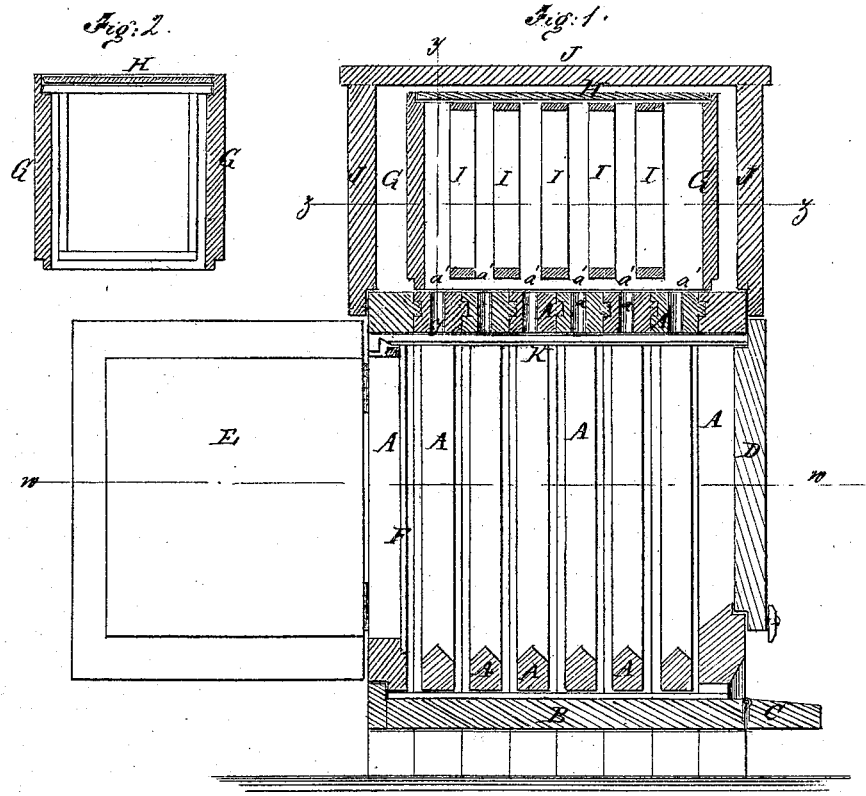
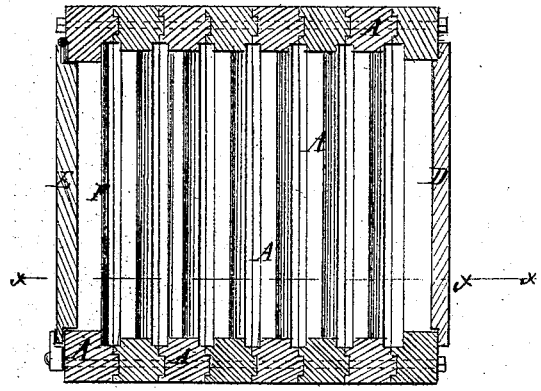
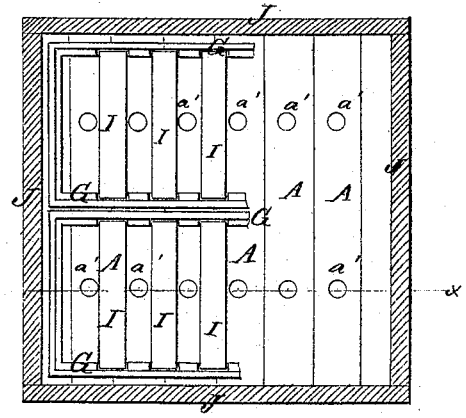
AM. PHOTO-LITHOGRAPHIC CO. N.Y. (OSBORNE'S PROCESS.)

127,498

UNITED STATES PATENT OFFICE.

SAMUEL D. McLEAN, OF SUNNY SLOPE, TENNESSEE.

IMPROVEMENT IN BEE-HIVES.

Specification forming part of Letters Patent No. 127,498, dated June 4, 1872.

Specification describing a new and useful Improvement in Bee-Hive, invented by SAMUEL D. McLEAN, of Sunny Slope, in the county of Lawrence and State of Tennessee.

Figure 1 is a detail vertical section of my improved hive taken through the line $x\,x$, Figs. 3 and 4. Fig. 2 is a detail vertical cross-section of one of the honey-boxes taken through the line $y\,y$, Fig. 1. Fig. 3 is a detail horizontal section of the honey-boxes taken through the line $z\,z$, Fig. 1. Fig. 4 is a detail horizontal section of the hive, taken through the line $w\,w$, Fig. 1.

Similar letters of reference indicate corresponding parts.

My invention has for its object to furnish an improved bee-hive, which shall be simple in construction, strong, and durable, and convenient in use, enabling the bees to be readily inspected and controlled as may be required; and it consists in the construction and arrangement of the bottom board.

The brood-chamber or hive proper is formed of vertical parallel frames A, the side and top bars of which may be grooved and tongued to each other, as shown in Figs. 1 and 4. The bottom bars of the frames A are made narrower than the side and top bars, and are made wedge-shaped upon their upper sides, as shown in Fig. 1, to allow the droppings to pass through freely, and to form passage-ways for the bees. The frames A may be firmly connected together by long bolts passed through their side bars, as shown in Fig. 4, or in any other convenient manner. The side bars of the frames A project below the bottom bars of said frames to form a base or foot for the hive. In the inner sides of the side bars of the frames A, just below the bottom bars of said frames, are formed grooves to receive the side edges of the bottom board B. The bottom board B has upwardly-projecting flanges formed upon the upper side of its rear and side edges, the inner edges of the side flanges being beveled off so that the droppings may fall away from the grooves in which said board works. This construction, by depressing the upper surface of the board B, allows the bees to pass freely below all the bottom bars of the frames A. The bottom bar of the front frame A projects a little lower than the other bottom bars, and is notched upon the middle part of its lower side to allow the bees to pass into and out of the hive freely. To the forward edge of the bottom board B is hinged the edge of a board, C, which, when turned down into a horizontal position, as shown in Fig. 1, forms a platform for the bees in entering and leaving the hive. The board C may be turned up into a vertical position to close the entrance to the hive or for convenience in storing the hives. The outer side of the front frame A is closed with a board, D. The outer side of the rear frame A is closed with a door, E, as shown in Figs. 1 and 4, which may be opened to allow the interior of the hive to be inspected through the glass plate F attached to the inner side of said rear frame A. The side edges of the inner sides of the side bars of the frames A may be rabbeted, as shown in Figs. 1 and 4, to adapt them to serve as comb-guides. G are the honey-boxes, which are made with open bottoms and tops. The inner sides of the top edges of the honey-boxes G are rabbeted, as shown in Figs. 1, 2, and 3, to receive a glass or wooden top, H. I prefer to use glass, as it allows the honey-boxes to be inspected without removing the top of said boxes. In the upper part of the sides of the honey-boxes G are formed notches to receive the comb-frames I. The bottom bars of the comb-frames I should be so far above the lower edges of the boxes G that the bees may pass freely beneath said frames I. The lower edges of the honey-boxes G are rabbeted upon their outer sides, as shown in Figs. 1 and 2, so that the lower end of one box may fit into the upper end of another box upon the hive or for transportation. In the top bars of the frames A are formed series of holes, $a'$, over which the honey-boxes G are placed, so that the bees may pass into and out of the said boxes G freely. The honey-boxes G are covered with a closed cap, J, the inner sides of the lower edges of which are rabbeted to fit upon the top of the frames A to hold said cap securely in place. In the under sides of the top bars of the frames A are formed transverse grooves, in such positions as to cross the lower ends of the holes $a'$, so that the slides K, when slipped into said grooves, may cover and close the lower ends of said holes, and thus prevent, when desired, the passage of the bees through said holes $a'$.

Having thus described my invention, I claim as new and desire to secure by Letters Patent—

The piece C, hinged to the sliding bottom board B, and arranged to form the alighting-board, when open, and to close the bee-entrance and fit flush with the side D of the hive when closed, as shown and described.

SAMUEL D. McLEAN.

Witnesses:
JOSEPH G. FULLER,
JOHN L. GLENN.